(12) United States Patent
Maten et al.

(10) Patent No.: US 7,478,572 B2
(45) Date of Patent: Jan. 20, 2009

(54) TRANSMISSION WITH TORQUE SENSORS AND METHOD OF CONTROLLING A TRANSMISSION

(75) Inventors: John R. Maten, Royal Oak, MI (US); Casie M. Bockenstette, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 287 days.

(21) Appl. No.: 11/363,523

(22) Filed: Feb. 27, 2006

(65) Prior Publication Data

US 2007/0199397 A1    Aug. 30, 2007

(51) Int. Cl.
    *F16H 3/08*    (2006.01)
(52) U.S. Cl. .......................................... 74/340; 74/331
(58) Field of Classification Search ................... 74/340, 74/331
    See application file for complete search history.

(56) References Cited

U.S. PATENT DOCUMENTS

| | | | |
|---|---|---|---|
| 6,520,274 B1 * | 2/2003 | McElmeel et al. ........... 180/444 |
| 6,991,584 B2 | 1/2006 | Cowan ......................... 477/110 |
| 7,226,389 B2 * | 6/2007 | Steen et al. ................... 477/195 |
| 2002/0088291 A1 * | 7/2002 | Bowen .......................... 74/339 |
| 2002/0092372 A1 * | 7/2002 | Bowen .......................... 74/339 |
| 2004/0224811 A1 * | 11/2004 | Vornehm et al. ............ 475/207 |
| 2005/0072255 A1 * | 4/2005 | McCrary et al. .............. 74/330 |
| 2006/0037422 A1 * | 2/2006 | Kuhstrebe et al. ............. 74/340 |
| 2006/0123939 A1 * | 6/2006 | Akutagawa ................... 74/329 |
| 2007/0214906 A1 * | 9/2007 | Fahland et al. ................ 74/340 |

* cited by examiner

*Primary Examiner*—Ha D. Ho

(57) ABSTRACT

A transmission is provided with torque sensors on each of the power flow paths through the transmission so that actual torque data may be used in place of estimated data in controlling various vehicle operating characteristics, such as clutch apply or release, traction control, stability control and grade control, all of which are affected by the actual torque carried by the transmission. A method of controlling an automatic, multi-speed transmission includes operatively connecting the first torque sensor to the first shaft that partially establishes the first power flow path for a speed ratio of the transmission, sensing torque carried by the first shaft and controlling at least one vehicle operating characteristic based at least partially on the sensed torque.

8 Claims, 3 Drawing Sheets

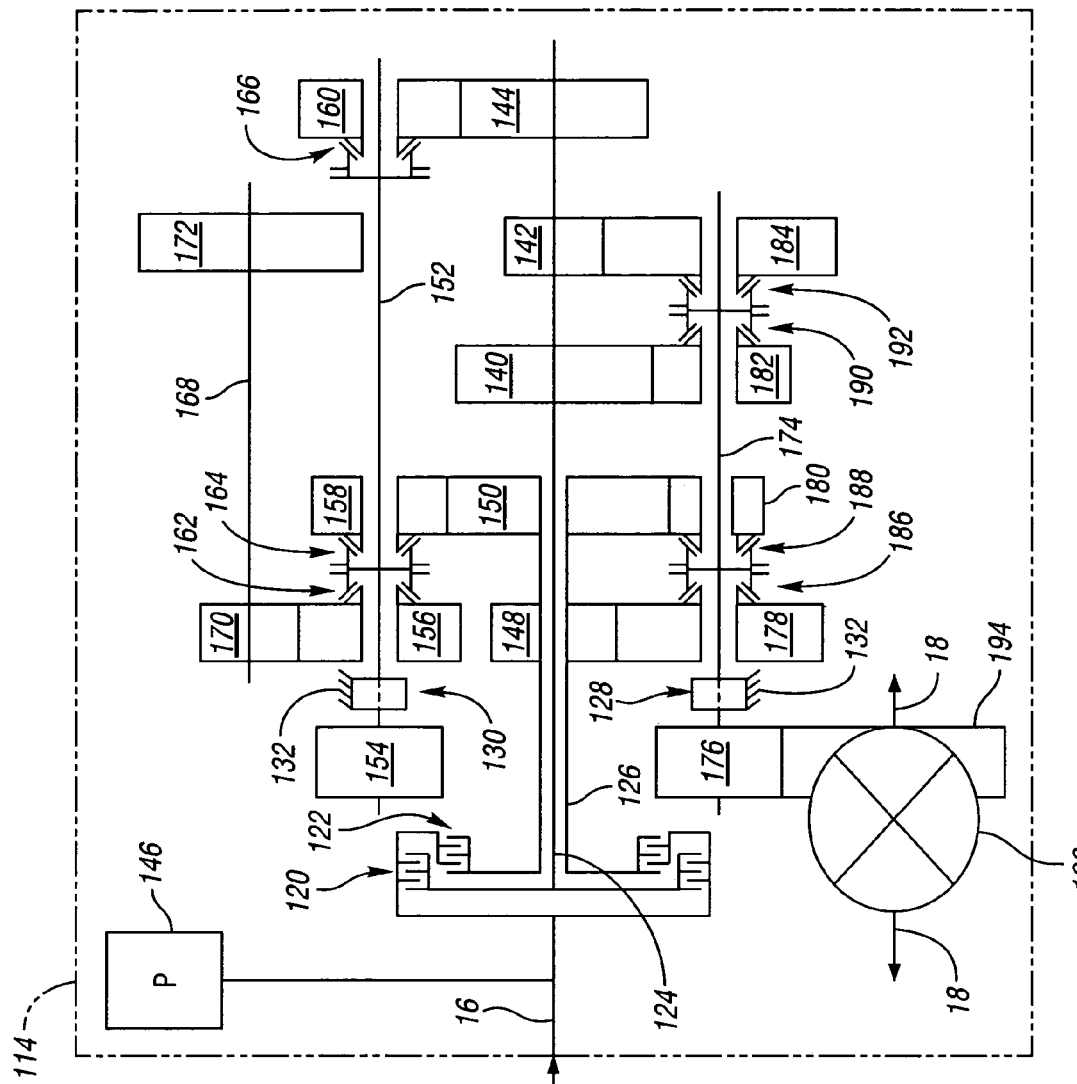
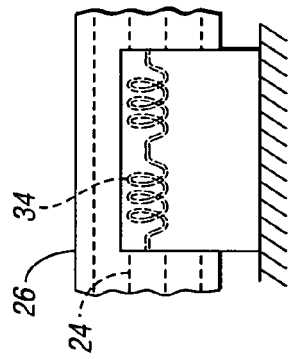

TRANSMISSION WITH TORQUE SENSORS AND METHOD OF CONTROLLING A TRANSMISSION

TECHNICAL FIELD

The invention relates to a transmission having torque sensors operatively connected to torque-carrying shafts and to a method of controlling a transmission utilizing the torque sensors.

BACKGROUND OF THE INVENTION

Various vehicle operating characteristics are affected by the torque being transmitted through a transmission. For instance, optimal shift feel between speed ratios involving a clutch-to-clutch shift requires the smooth transfer of torque from the offgoing clutch to the oncoming clutch. This is accomplished by controlling the release force of the offgoing clutch and the apply force of the oncoming clutch. The apply and release forces are a function of the hydraulic pressure and fill time of fluid fed to the clutches. Control of the clutches is usually accomplished by estimating the input torque to the transmission from an engine torque model. The rate of change of engine speed or transmission input speed is typically used in approximating the rate of torque capacity change at the clutches.

SUMMARY OF THE INVENTION

A transmission is provided with torque sensors on each of the power flow paths through the transmission so that actual torque data may be used in place of estimated data in controlling various vehicle operating characteristics, such as clutch apply or release, traction control, stability control and grade control, all of which are affected by the actual torque carried by the transmission.

Specifically, the transmission includes a first shaft at least partially defining a first power flow path between an input member and an output member of the transmission. A first torque sensor is operatively connected to the first shaft for sensing the torque carried by the first shaft. The transmission further includes a second shaft at least partially defining a second power flow path between the input member and the output member. A second torque sensor is operatively connected to the second shaft for sensing an amount of torque carried by the second shaft. At least one speed ratio results in power flow along the first path and at least another speed ratio results in power flow along the second path. Preferably, all speed ratios of the transmission result in power flow along a path that includes either the first shaft or the second shaft, so that an actual torque carried by the shafts can be used for control purposes as opposed to an estimated value.

For example, the transmission may include a first and a second torque-transmitting mechanism that are alternately selectively engagable to establish power flow along the first and second paths, respectively. The sensed torque provided via the first and second torque sensors may be utilized in controlling a shift between the two clutches. The clutches may be dual input clutches on a layshaft or countershaft transmission. The first and second shafts may be coaxial shafts or layshafts. Alternatively, the transmission may utilize planetary gearing. The torque sensors may be magnetoelectric, surface acoustic wave sensors or any other available type of torque sensor. A layshaft transmission may provide the greatest packaging flexibility to allow operative connection of the torque sensors to the respective shafts in the power flow paths. The torque sensors may be on shafts directly at the output of the first and second input clutches, upstream in power flow relation to gearing, to provide the most accurate torque reading and control of clutch engagement. Alternatively, the torque sensors may be on shafts downstream of the gearing, near the final drive mechanism to provide a torque reading most accurately reflecting the torque at the output member. As used herein components such as shafts are "upstream" in power flow in relation to other components in the transmission when they receive torque applied to the input member prior to the other components. Similarly, components are "downstream" in power flow relation to other components in the transmission when they receive torque applied to the input member after the other components.

A method of controlling an automatic, multi-speed transmission includes operatively connecting the first torque sensor to the first shaft that partially establishes the first power flow path for a speed ratio of the transmission, sensing torque carried by the first shaft and controlling at least one vehicle operating characteristic based at least partially on the sensed torque. The controlling step may include controlling engagement or disengagement of a first torque-transmitting mechanism that partially establishes the speed ratio along the first power flow path. The controlling step may also include updating an estimated control parameter used to establish a previous engagement or disengagement of the first torque-transmitting mechanism based on the sensed torque and then utilizing the updated control parameter to establish a subsequent engagement or disengagement of the first torque transmitting mechanism. This type of control is referred to as "closed loop" control as actual performance data (measured torque) is used to improve an estimated control parameter (estimated torque), which is used in determining a commanded fill time or fill pressure to establish engagement or disengagement of the first torque-transmitting mechanism. The estimated control parameter becomes a "learned" parameter as actual performance data replaces estimated data. The actual torque may even be used to update control of the torque transmitting mechanism during the same shift event in which the torque value is sensed. Use of actual torque may allow for less complex hydraulic control circuitry, as monitoring of other parameters necessary for an estimated torque calculation is not necessary.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a partially cross-sectional schematic end view illustration of a torque sensor operatively connected to a sleeve shaft of FIG. 1 taken at the arrows in FIG. 1;

FIG. 3 is a schematic side view illustration of the torque sensor of FIG. 2 with the sleeve shaft in fragmentary view;

FIG. 4 is a schematic illustration of a second embodiment of a powertrain with an engine and a dual input clutch transmission with torque sensors operatively connected to countershafts.

DESCRIPTION OF THE PREFERRED EMBODIMENTS

First Embodiment

Figure 1:
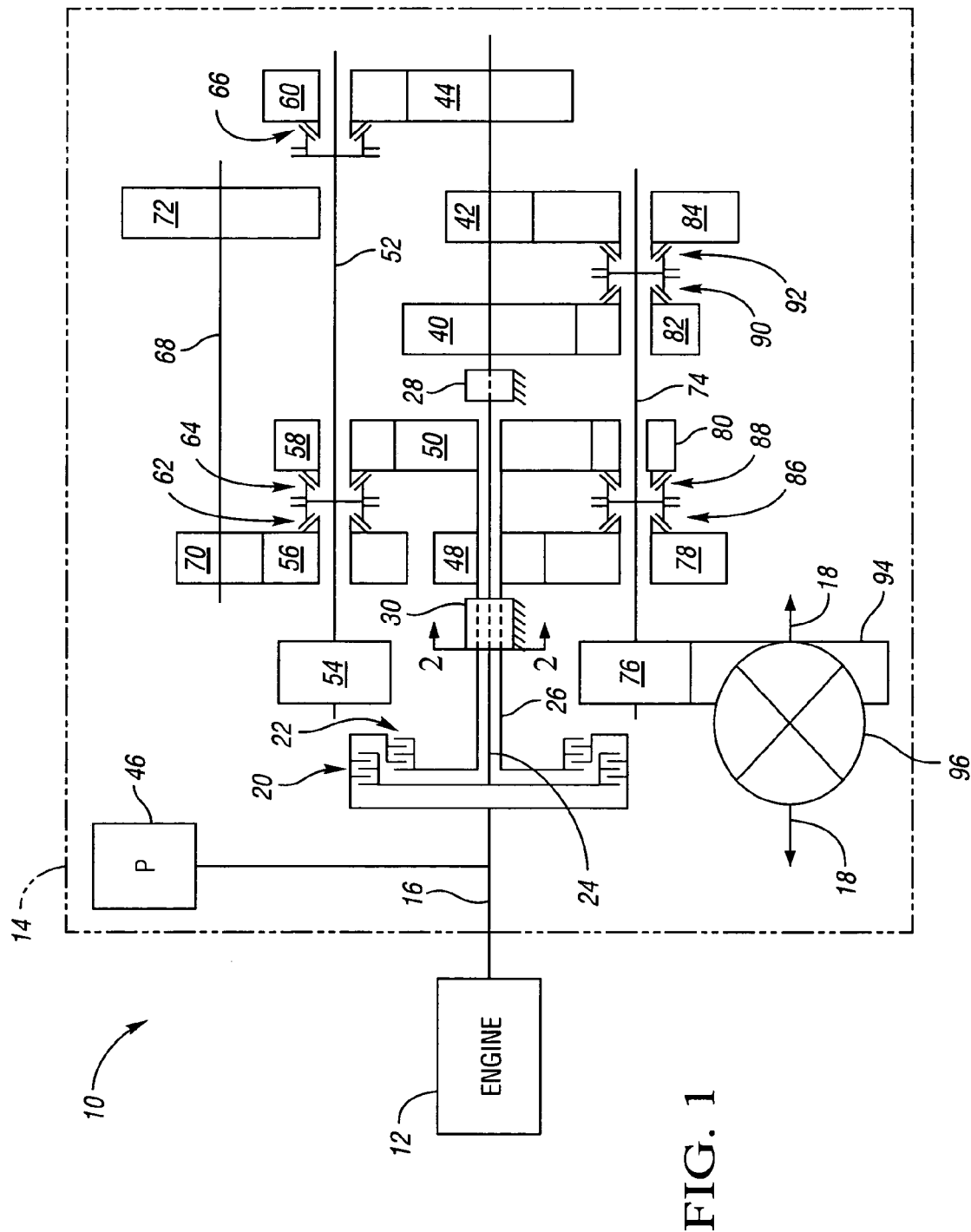
FIG. 1 is a schematic illustration of a first embodiment of a powertrain with an engine and a dual input clutch transmission with torque sensors operatively connected to coaxial shafts.

Referring to the drawings, wherein like reference numbers represent the same or corresponding parts throughout the several views, there is shown in FIG. 1 a powertrain 10 that includes a power source or engine 12 and a transmission 14. An output shaft of the engine 12 is connected with an input member 16 of the transmission 14. The input member 16 is typically a shaft, and may be referred to as an input shaft herein. A torque converter may be connected between the engine 12 and the transmission 14, as is known in the art. A plurality of torque-transmitting mechanisms such as friction clutches and synchronizers are selectively engagable to transfer torque from the input member 16 to a transmission output member 18 at multiple speed ratios achieved through a plurality of intermeshing gears, as discussed below.

The transmission 14 is a dual input clutch transmission, utilizing alternately selectively engageable first and second input clutches 20, 22 to transfer torque from the input member 16 to first and second coaxial shafts 24, 26, respectively. The first and second shafts 24, 26 partially form power flow paths through the transmission 14 depending on which of the input clutches 20, 22 and synchronizers (described below) are engaged to establish the various speed ratios.

A first torque sensor 28 is operatively connected to the first coaxial shaft 24 to sense the amount of torque carried by the first coaxial shaft 24 and a second torque sensor 30 is operatively connected to the second coaxial shaft 26 to sense the amount of torque carried by the second coaxial shaft 26. The sensed torque value can be utilized for many purposes, as described below. Referring to FIG. 2, an end view of the second torque sensor 30 is shown. In this embodiment, the second torque sensor 30 is a magnetoelectric torque sensor partially surrounding the first and second coaxial shafts 24, 26 and grounded to a stationary member 32 such as the transmission housing. Transmission housings are typically cast with numerous radially-extending bosses positioned to fit between the shafts and torque-transmitting mechanisms. The second torque sensor 30 is generally C-shaped, requiring minimal packaging space around the shaft 26. A magnetoelectric torque sensor that completely encircles the second shaft 26 may alternatively be employed. A portion of the second shaft 26 that is axially aligned with the sensor 30 is magnetized. The magnetoelectric torque sensor 30 employs coiled wires 34, 36, spaced circumferentially about the sensor 30, to relay a signal proportional to the change in magnetic properties generated by the second shaft 26 under torsional load created by the carried torque. The coiled wires 34, 36 are operatively connected to an electronic control unit (not shown) and relay the signal to the electronic control unit. The control unit analyzes the signal, correlates the signal with a corresponding torque value, and can control various vehicle operating parameters based on the information. Those skilled in the art will readily understand the operation and function of an electronic control unit for analyzing and processing sensed data to control the operation of a transmission. For instance, the control unit may be operatively connected to the input clutches 20, 22, through a network of solenoid valves and hydraulic circuits, to control the timing of engagement or disengagement of the clutches 20, 22. Use of a control unit to control clutch engagement, a traction control system, or other vehicle operating characteristic is well understood by those skilled in the art. FIG. 3 is a side view of the sensor 30, showing the coiled wire 34 in phantom. The portion of the first coaxial shaft 24 axially aligned with the sensor 30 is not magnetized or is not sufficiently close to the sensor 30 to affect the signal generated when the first coaxial shaft 24 is carrying torque. Instead, the first sensor 28 partially surrounds the first coaxial shaft 24, preferably with a C-shaped configuration similar to that of the second sensor 30, to relay the generated signal to the electronic control unit in a like manner. It should be appreciated that, within the scope of the invention, other types of torque sensors, such as surface acoustic wave sensors, may be used. Torque sensors are readily available from numerous sensor suppliers and may be customized for a particular packaging arrangement in a transmission application.

Referring again to FIG. 1, the remaining components of the transmission 14 include a plurality of intermeshing gears and a plurality of synchronizers. Gears 40, 42 and 44 are connected for common rotation with the first coaxial shaft 24. A pump 46 is also connected for rotation with the input member 16 and may be used to pressurize fluid for lubricating and cooling as well as generating the control pressure for the transmission 14. Gears 48 and 50 are connected for common rotation with the second coaxial shaft 26.

A first countershaft 52 is spaced from and generally parallel with the first and second coaxial shafts 24, 26. Gear 54 is connected for common rotation with first countershaft 52. Gears 56, 58 and 60 are rotatable about first countershaft 52 and are selectively engageable for common rotation with the first countershaft 52 via engagement of synchronizers 62, 64 and 66, respectively. Gear 58 continuously intermeshes with gear 50 and gear 60 continuously intermeshes with gear 44. A shaft 68 has gears 70 and 72 continuously connected for common rotation therewith. Gear 70 continuously intermeshes with gear 56 and although not shown in the two-dimensional schematic of FIG. 1, shaft 68 is actually positioned to create a somewhat triangular arrangement with respect to shafts 24 and 52 so that gear 72 continuously intermeshes with gear 42.

A second countershaft 74 is spaced from and is generally parallel with the first and second coaxial shafts 24, 26. Gear 76 is connected for common rotation with second countershaft 74. Gears 78, 80, 82 and 84 are rotatable about second countershaft 74 and are selectively engageable for common rotation with the second countershaft 74 via engagement of synchronizers 86, 88, 90 and 92, respectively. Gear 78 continuously intermeshes with gear 48. Gear 80 continuously intermeshes with gear 50. Gear 82 continuously intermeshes with gear 40. Gear 84 continuously intermeshes with gear 42. Gear 76 continuously intermeshes with gear 94 (a final drive ring gear), which in turn intermeshes with a differential 96 to transfer torque to the output member 18. Although not shown in the two-dimensional schematic of FIG. 1, gear 54 also continuously intermeshes with gear 94. Gears 54, 76 and 94 together with differential 96 establish a final drive mechanism.

The transmission 14 is operable for providing six forward speed ratios as well as a reverse speed ratio. Within the scope of the invention, a dual clutch transmission may provide a different number of forward speed ratios, such as five or seven. Each of the intermeshing gears is designed with a specific number of teeth to establish desirable torque ratio steps between adjacent torque ratios, as well as to affect the overall speed ratio obtainable with the transmission 14.

To establish the reverse speed ratio, the first input clutch 20 and the synchronizer 62 are engaged. Torque is transferred from the input shaft 16 to the first shaft 24. Torque is transferred from the first coaxial shaft 24 to shaft 68 via intermeshing gears 42 and 72. Torque is transferred from shaft 68 to countershaft 52 and then to output member 18 via intermeshing gears 70 and 56 and intermeshing gears 54 and 94, respectively. A "power flow path" through the transmission for a particular speed ratio includes the shafts and countershafts that carry torque, the intermeshing gears that transfer torque and the clutches and synchronizers that are engaged during that particular speed ratio. For instance, in the reverse speed ratio, first coaxial shaft 24, countershaft 52, shaft 68, gears 42, 72, 70, 56, 54, 94 and differential 96, as well as first input clutch 20 and synchronizer 62 form a power flow path from the input member 16 to the output member 18.

In the first forward speed ratio, the first input clutch 20 and synchronizer 92 are engaged. Torque is transferred from the input member 16 to the first coaxial shaft 24 and then to countershaft 74 via intermeshing gears 42 and 84. Torque is then transferred to the output member 18 via intermeshing gears 76, 94 and the differential 96. The power flow path for the first speed ratio includes first input clutch 20, first coaxial shaft 24, synchronizer 92, countershaft 74, gears 42, 84, 76, 94 and differential 96.

To shift from the first forward speed ratio to the second forward speed ratio, synchronizer 86 is preselected during the first forward speed ratio. First input clutch 20 is then disengaged as second input clutch 22 is engaged. Synchronizer 92 is then disengaged. With the engagement of the second input clutch 22 and synchronizer 86, torque is transferred from the input member 16 to second coaxial shaft 26 and then to countershaft 74 via the intermeshing gears 48 and 78. Torque is transferred from countershaft 74 to the output member 18 via intermeshing gears 76 and 94 and the differential 96 to establish the second forward speed ratio. The power flow path for the second forward speed ratio includes second input clutch 22, second coaxial shaft 26, countershaft 74, synchronizer 86, gears 48, 78, 76, 94 and differential 96.

To shift from the second speed ratio to the third speed ratio, synchronizer 90 is preselected (i.e., engaged) during the second speed ratio. The second input clutch 22 is then disengaged as the first input clutch 20 is engaged. Synchronizer 86 is then disengaged. With the engagement of the first input clutch 20 and synchronizer 90, torque is transferred from the input member 16 to the first coaxial shaft 24 and to the countershaft 74 via intermeshing gears 40 and 82. Torque is transferred to the output member 18 via intermeshing gears 76 and 94 and the differential 96 to establish the third forward speed ratio.

To shift from the third forward speed ratio to the fourth forward speed ratio, synchronizer 88 is preselected (i.e., engaged) during the third forward speed ratio. The second input clutch 22 is then engaged as the first input clutch 20 is disengaged. Synchronizer 90 is then disengaged. With the engagement of the second input clutch 22 and synchronizer 88, torque is transferred from the input member 16 to the second coaxial shaft 26, and to countershaft 74 via intermeshing gears 50 and 80. Torque is transferred from countershaft 74 to the output member 18 via intermeshing gears 76 and 94 and the differential 96 to establish the fourth forward speed ratio.

To shift from the fourth forward speed ratio to the fifth forward speed ratio, synchronizer 66 is preselected (i.e., engaged) during the fourth forward speed ratio. The second input clutch 22 is disengaged as the first input clutch 20 is engaged. Synchronizer 88 is then disengaged. With the engagement of the first input clutch 20, torque is transferred from the input member 16 to the first coaxial shaft 24 and to countershaft 52 via intermeshing gears 44 and 60. Torque is transferred from countershaft 52 to the output member 18 via intermeshing gears 54 and 94 and differential 96 to establish the fifth forward speed ratio.

To shift from the fifth forward speed to the sixth forward speed ratio, synchronizer 64 is preselected (i.e., engaged) during the fifth forward speed ratio. The second input clutch 22 is then engaged as the first input clutch 20 is disengaged. Synchronizer 66 is then disengaged. With the engagement of the second input clutch 22 and synchronizer 64, torque is transferred from the input member 16 to the second shaft 26 and to countershaft 52 via intermeshing gears 50 and 58, and from countershaft 52 to output member 18 via intermeshing gears 54 and 94 and differential 96 to establish the sixth forward speed ratio.

As discussed above, the first coaxial shaft 24 carries torque and partially forms a power flow path during the reverse speed ratio and the first, third and fifth forward speed ratios. Thus, the first torque sensor 28 can be employed to sense torque carried by the first shaft 24 during these speed ratios. The second coaxial shaft 26 carries torque and partially forms a power flow path during the second, fourth and sixth forward speed ratios. Thus, the second torque sensor 30 can be employed to sense torque carried by the second coaxial shaft 26 during these speed ratios. Because the torque sensors 28, 30 are upstream in power flow with respect to the plurality of gears and are directly at the output of the input clutches 20, 22, torque readings obtained from the torque sensors enable accurate control of engagement or disengagement of the dual input clutches 20, 22.

The actual torque reading gained by the first torque sensor 28 may be useful for a variety of purposes. For instance, if torque on the first shaft 24 sensed by the first torque sensor 28 differs from a predetermined value expected upon full engagement of the first input clutch 20, this may be indicative of a less than ideal shift. The actual torque reading provided via the first torque sensor 28 may be used to modify a vehicle operating condition affecting engagement of the first input clutch to improve the shift. For instance, the fill time, i.e., the time of expected full hydraulic capacity and thus engagement of input clutch 20, may be adjusted from a predetermined fill time on the next shift event utilizing first input clutch 20. The first torque sensor 28 can then sense the torque on first coaxial shaft 24 under the revised fill time and determine whether an improvement in expected torque, and thus shift feel, is achieved.

Another useful application of the actual torque data on coaxial shafts 24 and 26 sensed by torque sensors 28, 30 may be used to synchronize shifts from a speed ratio requiring engagement of the first input clutch 20 to a speed ratio requiring engagement of the second input clutch 22. For instance, in shifting from the first forward speed ratio to the second forward speed ratio, torque values provided by the first torque sensor 28 and the second torque sensor 30 may be analyzed by an electronic control unit (not shown) to synchronize the timing of disengagement of the first input clutch 20 with engagement of the second input clutch 22. If actual torque information indicates a less than ideal shift, the timing may be revised.

Second Embodiment

Referring to FIG. 4, a second embodiment of a transmission 114 within the scope of the invention is shown. A powertrain 100 includes the engine 12 and a transmission 114. An output shaft of the engine 12 is connected with an input member 16 of the transmission 114. The transmission 114 is a dual input clutch transmission, utilizing alternately selectively engageable first and second input clutches 120, 122 to transfer torque from the input member 16 to first and second coaxial shafts 124, 126, respectively. The first and second coaxial shafts 124, 126 partially form power flow paths through the transmission 114 depending on which of the input clutches 120, 122 and synchronizers (described below) are engaged to establish various speed ratios.

The transmission 114 further includes a plurality of intermeshing gears and a plurality of synchronizers. Gears 140, 142 and 144 are connected for common rotation with the first coaxial shaft 124. A pump 146 is also connected for rotation with the input member 16 and may be used to pressurize fluid used for lubricating and cooling as well as generating the control pressure for the transmission 114. Gears 148 and 150 are connected for common rotation with the second shaft 126.

A first countershaft 152 is spaced from and generally parallel with the first and second coaxial shafts 124, 126. Gear 154 is connected for common rotation with countershaft 152. Gears 156, 158 and 160 are rotatable about countershaft 152 and are selectively engageable for common rotation with the countershaft 152 via engagement of synchronizers 162, 164 and 166, respectively. Gear 158 continuously intermeshes with gear 150 and gear 160 continuously intermeshes with gear 144. A shaft 168 has gears 170 and 172 continuously connected for common rotation therewith. Gear 170 continuously intermeshes with gear 156 and, although not shown in the two-dimensional schematic of FIG. 1, shaft 168 is actually positioned to create a somewhat triangular arrangement with respect to shafts 124 and 152 so that gear 172 continuously intermeshes with gear 142.

Countershaft 174 is spaced from and generally parallel with the first and second coaxial shafts 124, 126. Countershaft 174 is referred to in the claims as the first shaft and countershaft 152 is referred to in the claims as the second shaft. Gear 176 is connected for common rotation with countershaft 174. Gears 178, 180, 182 and 184 are rotatable about countershaft 174 and are selectively engageable for common rotation with the countershaft 174 via engagement of synchronizers 186, 188, 190 and 192, respectively. Gear 178 continuously intermeshes with gear 148. Gear 180 continuously intermeshes with gear 150. Gear 182 continuously intermeshes with gear 140. Gear 184 continuously intermeshes with gear 142. Gear 176 continuously intermeshes with gear 194 (a final drive ring gear), which in turn intermeshes with a differential 196 to transfer torque to the output member 18. Although not shown in the two-dimensional schematic of FIG. 1, gear 154 also continuously intermeshes with gear 194. Gears 154, 176 and 194 with differential 196 together establish a final drive mechanism. The transmission 114 provides a reverse speed ratio and six forward speed ratios in like manner as transmission 14. That is, clutches and synchronizers are engaged according to the same engagement schedule as like-numbered clutches and synchronizers in transmission 14, like-numbered clutches and synchronizers being raised by 100 in FIG. 4 with respect to those of FIG. 1.

A first torque sensor 128 is operatively connected with countershaft 174 to sense torque carried by the countershaft 174. The first torque sensor 128 is grounded to transmission housing 132 and is preferably a magnetoelectric type sensor, although a surface acoustic wave or other type of sensor may alternatively be employed.

A second torque sensor 130 is operatively connected with countershaft 152 to sense torque carried by the countershaft 152. The second sensor 130 is grounded to transmission housing 132 and is preferably a magnetoelectric type sensor, although a surface acoustic wave or other type of sensor may alternatively be employed.

Sensed torque data from the sensors 128, 130 may be used to control a vehicle operating characteristic such as by adjusting a control parameter, such as the fill time of one or both of the input clutches 120, 122 if the sensed torque indicates a less than optimal shift feel. Also, because the sensors 128, 130 are downstream in power flow from the gears included in transmission 114, except for the gears 154, 176, 194 and differential 196, torque sensed by torque sensors 128 and 130 is closely indicative of the true output torque at the output member 18, as only the gear ratio established through the final drive mechanism must be accounted for to relate torque at the respective countershafts 152, 174 to torque at the output member. Thus, the torque sensors 128 and 130 may be useful for monitoring and adjusting vehicle parameters related to output torque, such as a traction control system or shift feel.

Figure 5:
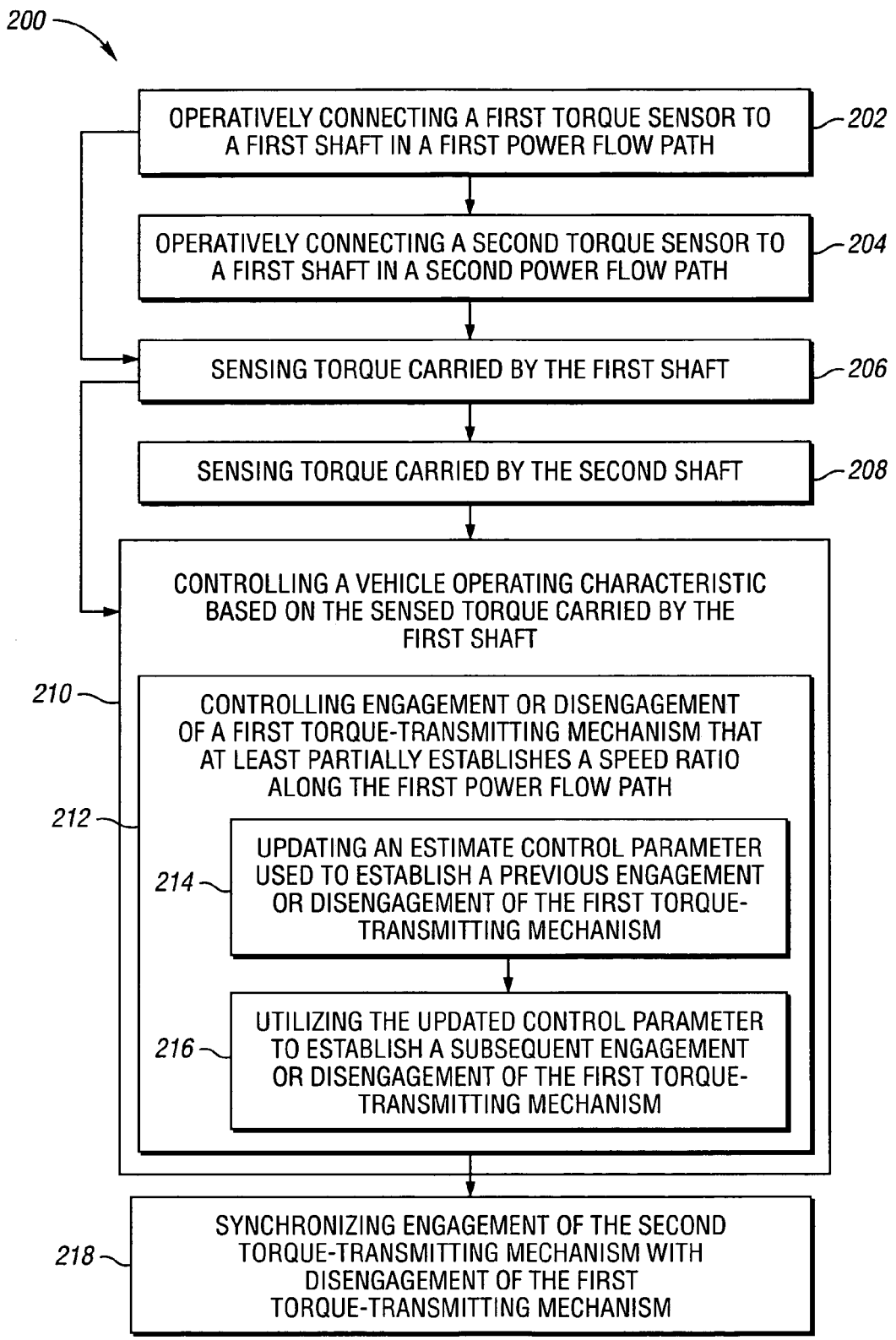
FIG. 5 is a flow diagram of a method of controlling a transmission.

Referring to FIG. 5, a flow diagram illustrates a method 200 of controlling an automatic, multi-speed transmission. The method 200 will be described with respect to the transmissions 14 and 114 shown in FIGS. 1 and 4, although it may be applied equally to other transmission embodiments that utilize first and second torque sensors on two different power flow paths, as described herein.

First, the method 200 includes step 202, operatively connecting a first torque sensor 28 to a first shaft 24 that partially establishes a first power flow path for a particular speed ratio of the transmission 14. Optionally, the method 200 includes step 204, operatively connecting a second torque sensor 30 to a second shaft 26 that partially establishes a second power flow path for a different speed ratio of the transmission 14. The method 200 may include step 206, sensing torque carried by the first shaft 24. If a second torque sensor is employed and step 204 occurs, the method 200 also includes step 208, sensing torque carried by the second shaft 26.

The method 200 then proceeds to step 210, controlling a vehicle operating characteristic based on the sensed torque of step 206 and optionally of step 208 as well. For example, the vehicle operating characteristic may be a parameter that affects the timing of engagement of disengagement of a clutch, to improve shift feel. For instance, step 210 may include step 212, controlling engagement or disengagement of a first torque-transmitting mechanism such as first input clutch 20 of FIG. 1, that at least partially establishes a speed ratio along a first power flow path. Step 212 may in turn include step 214, updating an estimated control parameter used to establish a previous engagement or disengagement of the first torque-transmitting mechanism. For example, the sensed torque may indicate that the first input clutch 20 is applied too late. An estimated control parameter, such as the designated fill time for full capacity of the first input clutch 20 may then be updated to command an earlier fill time so that first input clutch 20 will apply earlier. After step 214, step 212 may include step 216, utilizing the updated control parameter to establish a subsequent engagement or disengagement of the first torque-transmitting mechanism. Thus the updated fill time stored in a control unit may be utilized to command an earlier engagement of the first input clutch 20. Finally, assuming the vehicle operating characteristic controlled in step 210 is disengagement of the first torque-transmitting mechanism, and that steps 204 and 208 have been performed, the method 200 may include step 218, synchronizing engagement of the second torque-transmitting mechanism with disengagement of the first torque-transmitting mechanism. Accordingly, the torque on the first shaft 24 sensed by the first torque sensor 28 in step 206 is used to control disengagement of the first torque transmitting mechanism (first input clutch 20) in step 210. The torque sensed on the second shaft 26 in step 208 may then be used to adjust the engagement of the second torque-transmitting mechanism (second input clutch 22) so that a shift from the first to the second forward speed ratio is synchronous.

Alternatively, especially in a transmission embodiment having sensors connected to shafts downstream of the input clutches and intermeshing gears, such as sensors 128 and 130 on the transmission 114 of FIG. 4, the vehicle operating characteristic controlled in step 210 may be an input parameter of a traction control system, a stability control system or a grade control or hill hold system, as the performance of each of these systems is affected by actual output torque.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member;
an output member;
a first shaft at least partially defining a first power flow path between said input member and said output member;
a second shaft at least partially defining a second power flow path between said input member and said output member;
first and second coaxial shafts further defining said first and second power flow paths, respectively; wherein said first and second shafts are countershafts spaced generally parallel with said input member, said output member, and said first and second coaxial shafts;
a first torque-transmitting mechanism selectively engagable to at least partially establish power flow from said input member to said output member along said first power flow path;
a second torque-transmitting mechanism selectively engagable to at least partially establish power flow from said input member to said output member along said second power flow path;
a first torque sensor operatively connected to said first shaft for sensing an amount of torque carried by said first shaft; and
a second torque sensor operatively connected to said second shaft for sensing an amount of torque carried by said second shaft;
wherein said transmission is characterized by multiple speed ratios; wherein at least one of said speed ratios is characterized by power flow along said first path; and
wherein at least another of said speed ratios is characterized by power flow along said second path.

2. The transmission of claim 1, wherein disengagement of said first torque-transmitting mechanism and engagement of said second torque-transmitting mechanism at least partially accomplishes a shift from said one of said speed ratios to said another said speed ratios.

3. The transmission of claim 1, wherein alternate selective engagement of said first and said second torque-transmitting mechanism connects said input member with said first and second shafts, respectively.

4. The transmission of claim 1, wherein said first and second shafts are coaxial.

5. The transmission of claim 1, wherein said torque sensors are magnetoelectric sensors.

6. The transmission of claim 1, further comprising:
a plurality of intermeshing gears, different ones of which at least partially form said power flow paths for transferring torque from said input member to said output member; and
wherein said torque sensors are operatively connected to said respective shafts upstream of at least some of said gears in said respective power flow paths.

7. The transmission of claim 1, further comprising:
a plurality of intermeshing gears, different ones of which at least partially form said respective power flow paths for transferring torque from said input member to said output member; and
wherein said torque sensors are operatively connected to said respective shafts downstream of at least some of said gears in said respective power flow paths 8. A transmission comprising:
an input member;
an output member;
a first shaft at least partially defining a first power flow path between said input member and said output member;
a second shaft at least partially defining a second power flow path between said input member and said output member;
first and second coaxial shafts further defining said first and second power flow paths, respectively; wherein said first and second shafts are countershafts spaced generally parallel with said input member, said output member, and said first and second coaxial shafts;
a first torque sensor operatively connected to said first shaft for sensing an amount of torque carried by said first shaft;
a second torque sensor operatively connected to said second shaft for sensing an amount of torque carried by said second shaft;
a first torque-transmitting mechanism selectively engagable to at least partially establish power flow from said input member to said output member along said first power flow path;
a second torque-transmitting mechanism selectively engagable with said first torque-transmitting mechanism alternately to at least partially establish power flow from said input member to said output member along said second power flow path;
a plurality of intermeshing gears, different ones of which at least partially form said power flow paths for transferring torque from said input member to said output member; and
wherein said torque sensors are operatively connected to said respective shafts downstream of said first and second torque-transmitting mechanisms, said coaxial shafts, and at least some of said gears in said respective power flow paths.

* * * * *